A. J. FURLONG.
WIRE STRIPPER.
APPLICATION FILED AUG. 14, 1908.
927,345.
Patented July 6, 1909.
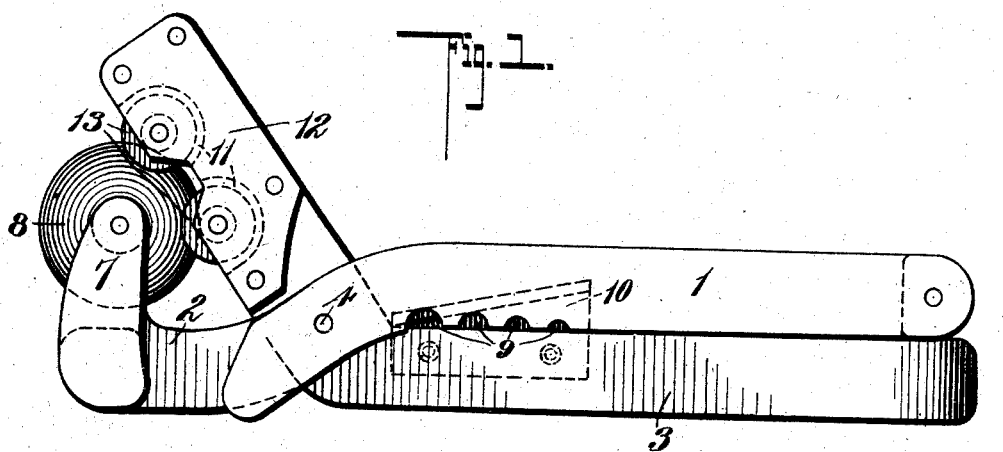
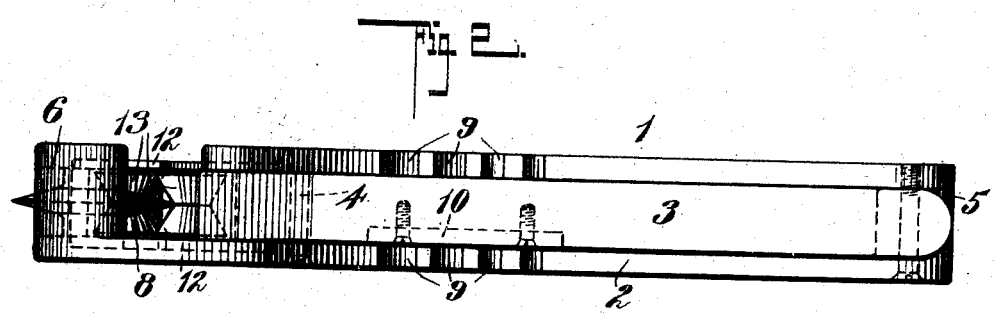
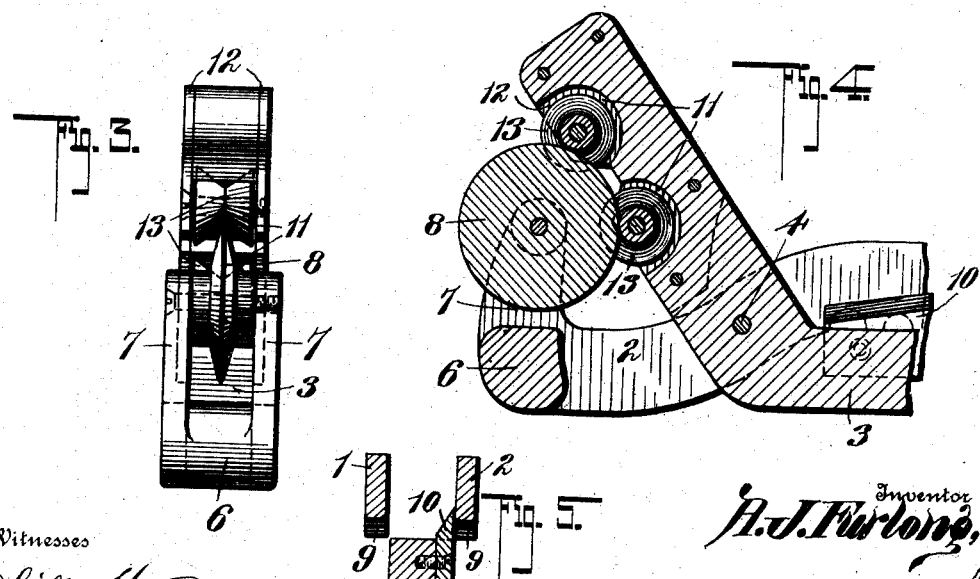
Witnesses
Philip H. Burch
E. B. McBath
Inventor
A. J. Furlong,
By Meara & Burch
Attorneys

UNITED STATES PATENT OFFICE.

ALEXANDER J. FURLONG, OF SALT LAKE CITY, UTAH.

WIRE-STRIPPER.

No. 927,345.  Specification of Letters Patent.  Patented July 6, 1909.

Application filed August 14, 1908. Serial No. 448,585.

*To all whom it may concern:*

Be it known that I, ALEXANDER J. FURLONG, a citizen of the United States, residing at Salt Lake City, in the county of Salt Lake and State of Utah, have invented a new and useful Improvement in Wire-Strippers, of which the following is a specification.

This invention relates to a device for cutting and stripping insulation from electric wires, combined with means for also cutting wires of different sizes.

The object of the invention is a device of this kind which can be employed in stripping insulation from wires already in place, as well as from disconnected wires. In order to do this it is necessary that the stripping device should be so constructed that the wire can enter a stripping mechanism from the side.

The invention consists in the novel features of construction hereinafter described, pointed out in the claims and shown in the accompanying drawings, in which—

Figure 1 is a side elevation. Fig. 2 is an inverted plan view. Fig. 3 is an end elevation. Fig. 4 is a longitudinal sectional view taken through the operative end of the device. Fig. 5 is a transverse section through a handle, side plates, and a cutting blade.

In these drawings 1 and 2 represent parallel side plates and 3 represents an angled shank the handle portion of which lies, when the device is in horizontal position, below the side plates 1 and 2, and the forward angled portion extends between said plates and terminates at a point above them.

A pivot pin 4 passing through the side plates and the angled portion of the shank 3 pivots them together and the side plates 1 and 2 are also connected at their rear ends by forming a lug 5 upon the side of the plate 2 over an end of which the plate 1 fits, and to which it is connected by means of a suitable screw. The side plate 2 also has a laterally extending lug or boss 6. Rising upwardly from this lug and at right angles to the handle portion of the shank 3, when the parts are in operative position, are bearing plates 7 between which is journaled a cutting disk 8. The angled portion of the shank 3 which overhangs the disk 8 is cut out as shown at 11 and each of the cut out portions so formed is inclosed between side plates 12 carried by the shank and in these said plates are journaled concaved or grooved rollers 13 which coöperate with the cutting disk 8, the rollers and the disk being brought into positive engagement with each other when the two handle members, consisting respectively of the plates 1 and 2 and the shank 3, are brought together.

In order to afford side entrance to the wire the side plate 1 terminates short of the forward end of the side plate 2 and is also slightly spaced from one of the plates 12. In order to cut the wire the plates 1 and 2 are provided with a series of graduated notches 9 and a cutting blade 10 is set into one side of the shank 3 and works across the inner face of the notches formed in the plate 2.

What I claim is:—

1. A device of the kind described, comprising side plates spaced apart, one of said plates being of greater length than the other, a cutting disk carried by the longer plate, an angled shank pivoted between said side plates adjacent to their forward ends and overhanging said disk, and coöperating rollers carried by said shank in position to engage the disk.

2. A device of the kind described, comprising two side plates, connecting means at their rear ends, an angled shank passing transversely between said side plates adjacent to their forward ends, the forward end of the shank being recessed upon its inner face, bearing plates carried by the forward end of one of the side plates, the said side plate being of greater length than the other side plate, a cutting disk journaled in said bearing plates, and concave rollers journaled in the recesses of the shank and coöperating with said disk.

ALEXANDER J. FURLONG.

Witnesses:
F. E. STRAUP,
F. W. QUINN.